Nov. 30, 1948.    W. SACKVILLE    2,454,841
APPARATUS FOR DETECTING THE PRESENCE AND POSITION
OF AN INVISIBLE BODY BY INFRA-RED RADIATION
Filed July 16, 1938    3 Sheets-Sheet 1
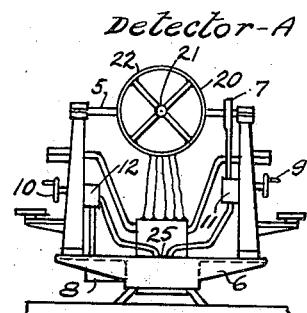
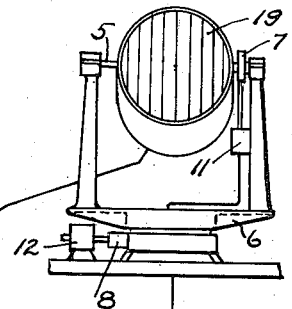
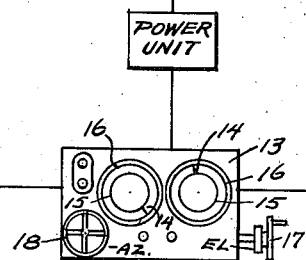
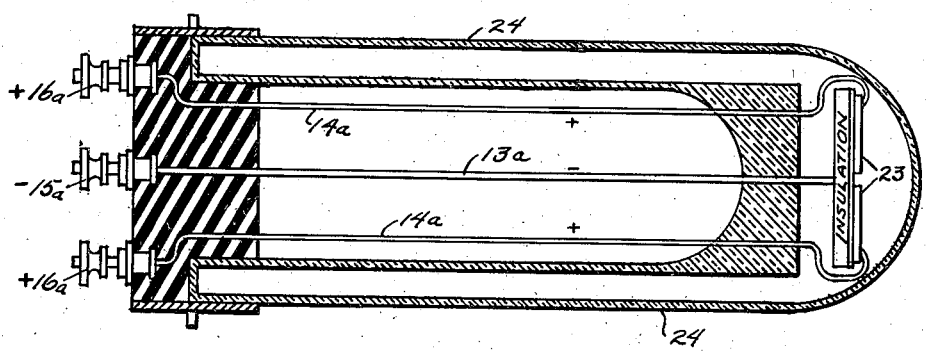
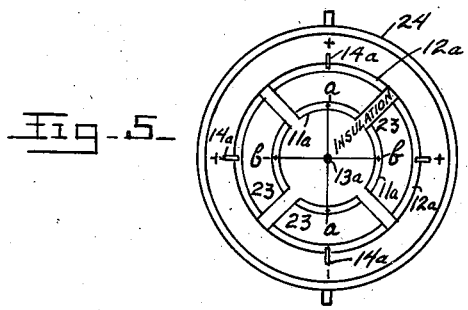
Inventor
William Sackville
By Adam Richmond
Attorney.

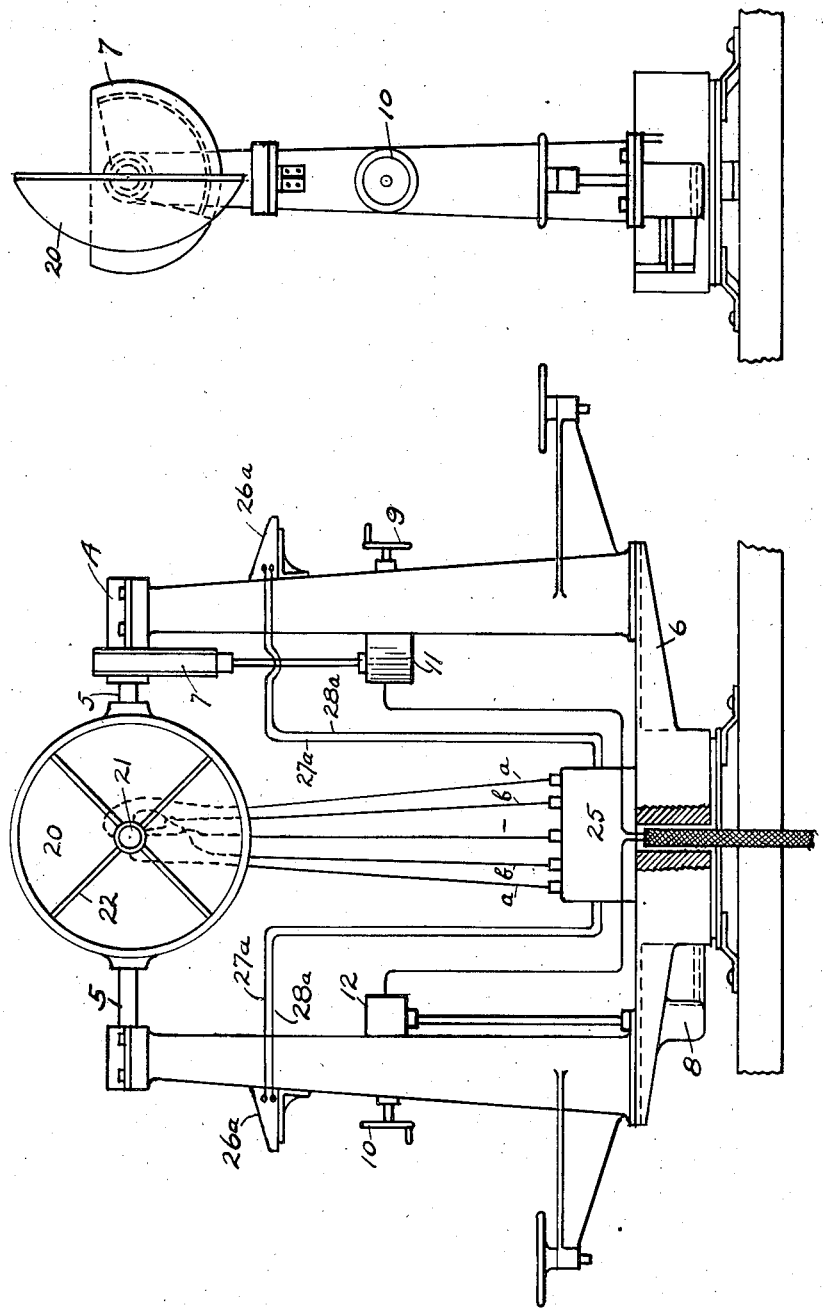

Nov. 30, 1948.   W. SACKVILLE   2,454,841
APPARATUS FOR DETECTING THE PRESENCE AND POSITION
OF AN INVISIBLE BODY BY INFRA-RED RADIATION
Filed July 16, 1938   3 Sheets-Sheet 3
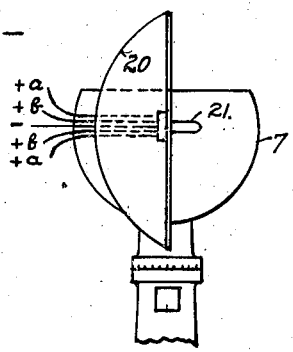
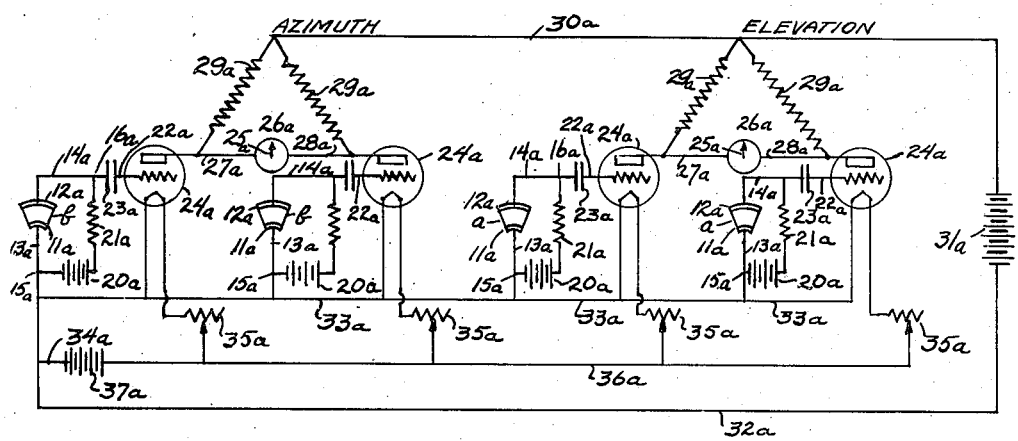
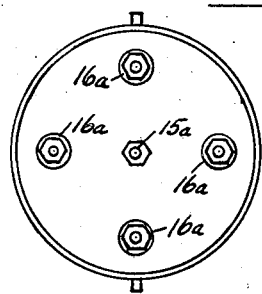
Inventor
William Sackville
By Adam Richmond
Attorney.

Patented Nov. 30, 1948

2,454,841

UNITED STATES PATENT OFFICE 2,454,841

APPARATUS FOR DETECTING THE PRESENCE AND POSITION OF AN INVISIBLE BODY BY INFRARED RADIATION

William Sackville, United States Army, Berkeley, Calif., assignor to the United States of America as represented by the Secretary of War Application July 16, 1938, Serial No. 219,593

3 Claims. (Cl. 250—83.3)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a method of and apparatus for detecting the presence and position of an invisible body.

Instruments for measuring radiant energy are divided into three groups.

Group I consists of nonselective radiometers such as the thermopile, which function upon thermal conditions independently of the (frequency) wave length of stimulus.

Group II includes resistance cells such as the thalofide cell, which have the property of decreasing in electric resistance when exposed to radiant energy of short wave lengths, the character of the phenomenon depending entirely upon the wave length of the radiant energy stimulus.

Group III includes substances called photoelectric cells which when charged to a negative potential in an evacuated chamber, lose their charge when exposed to light of short wave length.

Groups II and III which are selectively sensitive to various wave lengths will hereinafter be referred to as photoelectric cells to distinguish from the thermosensitive detectors.

The principal disadvantage in the use of nonselective radiometers for locating airplanes as proposed in the patent to S. O. Hoffman, 1,343,393, of June 15, 1920, resides in their inability to distinguish between the heat radiations from the exhaust of the airplane and other sources of radiation which may be deflected. This condition or sky effect renders such devices unreliable when clouds are present.

According to the present invention it is proposed to employ a photoelectric cell which preferably has a maximum sensitivity in the region where the energy distribution curve of the exhaust gases is a maximum. It is further proposed to associate a radiation detector and a radiation projector for synchronous movement in azimuth and elevation so that an invisible object may be flooded with waves of radiant energy which are reflected to the detector. The effect on the detector is interpreted in some physical manifestation or response that is capable of being observed.

Fig. 1 is a more or less diagrammatical view illustrating the invention;

Fig. 2 is an enlarged view of the detector unit;

Fig. 3 is an end elevation of the detector unit;

Figs. 4 and 5 are respectively a longitudinal sectional view and a view in end elevation of a detector tube;

Fig. 6 is a rear elevation of the detector tubes;

Fig. 7 is a side elevation of the detector tube and its mounting and illustrating the positive and negative leads extending from the detector; and Fig. 8 is a diagrammatic view of the complete detector and its circuits.

Referring to the drawings by characters of reference:

There is shown in Fig. 1 a radiant energy detector unit A and a radiant energy projector unit B which may be separated about 100 yards or more to avoid confusion because of diffused energy around the searchlight projector and reflection from dust particles in the air. Units A and B may, however, be mounted with their axes parallel to each other and side by side in the same mounting.

In either case the units are similarly mounted, being supported by trunnions 5 on a rotatable carriage 6 and are moved in elevation and azimuth by gearing indicated at 7 and 8. In the case of the detector unit A, shown on Fig. 2, the gearings 7 and 8 are mechanically operated through elevation handwheel 9 and traversing handwheel 10.

The units when separated, are synchronously connected by means of any known automatic electric transmission system such, for example, as is employed for remote control of guns where the power output from a director controls the application of power from a constantly operating motor to the training mechanism of the gun or such as is employed between sound locating apparatus and a searchlight where the movements of these two units are electrically recorded for comparison. In the latter system, illustrated in connection with the invention, a transmitter motor 11 for each elevation gear train 7 and a transmitter motor 12 for each azimuth gear train are each connected to a receiver motor in the comparator 13. The armature of each receiver motor is geared to a dial, the dials being concentrically paired for elevation and azimuth as designated and having pointers 14—14 indicative of the position of the units. The inner dials 15 are associated with the transmission system from the detector unit A and the outer dials 16 with the system from the projector unit B. A control for the projector B is indicated by the elevation handwheel 17 and the azimuth handwheel 18. By keeping the pointers 14 matched, parallelism or no difference in position will be indicated.

The projector B may conveniently consist of a searchlight having a filter 19 which will screen out the visible light and transmit the short wave infra-red rays. When the projector is directed at an invisible object such as an airplane, the waves will be reflected by the airplane and collected in the mirror 20 of the detector unit A. The mirror which has a polished reflecting surface especially efficient in reflecting radiant energy is of parabolic construction, or spherical with a radius approximately the curvature of a parabola with a long focal length, or of some other type having a definite focal point. The collecting power of the receiver may be increased by employing more than one mirror in the manner practiced with optical instruments.

A detector 21 is supported at the focal point of the mirror by arms 22 and is preferably arranged for slight adjustment. The detector comprises a plurality of photoelectric cells 23 which may be arranged in one tube 24, as shown in Fig. 4, or in individual tubes. The cells, composed of photosensitive material, such as thalofide or caesium, are arranged in two combinations a—a and b—b on intersecting base lines and respectively afford lateral and vertical impressions or indications of azimuth and elevation.

While the response of the cells 23 to radiant energy may be indicated by any well known device for indicating the flow of electrical energy, the system shown diagrammatically in Fig. 8 is preferred.

In Fig. 8 the quadrants a—a, b—b of the tube or container 24 are shown with their electrodes 11a and 12a, also lead wires 13a and 14a and binding posts 15a and 16a. A source of electrical current supply 20a has its minus terminal connected to the binding post 15a, and its plus terminal connected through resistance 21a to the binding post 16a. The binding post 16a is connected through lead wires 22a, in each of which is introduced a condenser 23a to the grids of the triodes 24a. Condensers 23a are so chosen that the capacity thereof will prevent a permanent change of bias on the grids, but at the same time allow a varying circuit voltage to pass to the grids. Such a condition will prevent the needles 25a of the two-way reading galvanometers 26a—26a drifting from their zero positions due to temperature and other minor changes in circuit while at the same time, they will cause movement of the needles due to the reception of an unequal amount of energy or stimulus upon the faces of the paired segments. Thus the recorder is activated only when a varying voltage is applied to one of the two paired grids of the amplifier tubes.

Galvanometers 26a—26a are connected across the plates of respective pairs of tubes through lead wires 27a—27a and 28a—28a. Resistances 29a therein shown as of 100,000 ohms, are connected to the respective wires 27a and 28a and to a lead wire 30a from the plus terminal of a battery 31a, the other terminal of which battery is connected through wire 32a to binding post 15a. The minus terminals of the filaments of the triodes 24a through the lead wire 33a are connected to the lead wires 32a at 34a, while the plus terminals of said filaments are connected through resistance 35a, to the lead wire 36a, connected to the plus terminal of a source of electrical current supply 37a, the other terminal of which is connected through lead 38a to the lead wire 32a.

Mounting a multi-cell detector at the focus of a parabolic mirror exposes the paired segments a—a and b—b to the adjacent portions of the field of view, as will be readily understood without further discussion. When this field is composed of an equal energy background, no contrast exists between the adjacent portions of the field of view, and the sensitive material of each segment will receive an equal amount of energy stimulus. This background may be represented by the natural sky or by an artificial sky (radiant background) produced by placing energy therein. In either case an equal energy background will produce no directional effect in the multi-cell. However, when an object appears in one portion of the field of view of the receiver mirror, segments of the multi-cell will receive an unequal amount of energy stimulus and thus produce a manifestation of directional effect in the galvanometer, as will be understood without further discussion.

The location of an object is accomplished by sweeping an area with the apparatus, but because of its limited field, it is preferably employed in conjunction with auxiliary means such as a sound locator. It is to be understood that the nature of the filter on the searchlight and the nature of the sensitive cells of the detector tube is governed by the particular wave band of the radiation spectrum which is employed. Inasmuch as the photoelectric cell may be operated so that the response is directly proportional to the intensity of the stimulus, the device under discussion may be employed to determine the range or distance to the invisible object.

The electrical assembly illustrated in Fig. 8 may be arranged in a suitable housing 25 mounted on the carriage 6 of detector unit A, as clearly shown in Fig. 2 of the drawings. Likewise the indicating galvanometers 26a adapted to afford readings in elevation and azimuth, may be supported by suitable brackets attached to the uprights of carriage 6, immediately above the handwheels 9 and 10, as shown in Fig. 2 of the drawings. Arranging the galvanometers 26a in this manner, places the appropriate indicator within the field of view of each of the two operators assigned to the control of the detector unit in elevation and in azimuth, as will be readily understood without further discussion.

Having described my invention, what I claim as new and wish to secure by Letters Patent is:

1. An apparatus of the character described, comprising a base, means supporting the base for rotation about a vertical axis, reflector supports carried by the base, a reflector swiveled between the supports for movement about an axis normal to that of said base, manual control means mounted on said supports for actuating said reflector and base about their respective axes to effect adjustment of the reflector in azimuth and elevation, detector means disposed within the focal region of the reflector, said means including a container, and a plurality of oppositely paired spaced segments of material sensitive to radiant energy annularly arranged within the container, indicating means mounted upon each of said supports, and an electro-responsive mechanism positioned upon the base and controlling said indicating means, said electro-responsive mechanism including means in electrical relation with the segments for balancing out the effect of background radiation when said segments receive an equal amount of energy stimulus and for indicating through said indicating means, changes in background radiation when the said segments receive an unequal amount of energy stimulus.

2. In an apparatus of the character described, the combination with a reflector mounting, a parabolic reflector carried by said mounting, means in connection with the reflector and mounting to effect adjustment of said reflector in azimuth and elevation, detector means disposed within the focal region of the reflector, said means including a container, and a plurality of oppositely paired spaced segments of material sensitive to radiant energy annularly arranged within the container; of means in electrical relation with the segments for balancing out the effect of background radiation when said segments receive an equal amount of energy stimulus and for indicating changes in background radiation when said segments receive an unequal amount of energy stimulus, said means including a pair of triodes for each pair of oppositely spaced segments, electrical connections between the outer marginal portions of the segments and the grids of the triodes, means interposed in said connections to prevent a permanent change in grid bias while permitting a varying circuit voltage to pass to the grid, connections between the inner marginal portions of the segments and the filaments of the triodes, a source of direct current electrical supply connected to the grid and filament connections, an indicator connected across the plates of each pair of triodes, means for supplying current to the filament and means including resistance for each plate for supplying current to the plates.

3. In an apparatus of the character described, the combination with a reflector mounting, a parabolic reflector carried by said mounting, means in connection with the reflector and its mounting to effect adjustment of said reflector in azimuth and elevation, detector means disposed within the focal region of the reflector, said means including a container and a plurality of oppositely paired spaced segments of material sensitive to radiant energy annularly arranged within the container; of a pair of triodes for each pair of oppositely spaced segments, electrical connections between the outer marginal portions of the segments and the grids of the triodes, means interposed in said connections to prevent a permanent change in grid bias, while permitting a varying circuit voltage to pass to the grid, connections between the inner marginal portions of the segments and the filaments of the triodes, a source of direct current electrical supply connected to the grid and filament connections, an indicator across the plates of each pair of triodes, means for supplying current to the filament and means including resistances for each plate for supplying current to the plates.

WILLIAM SACKVILLE.

REFERENCES CITED

The following references are of record in the file of this patent:

UNITED STATES PATENTS

| Number | Name | Date |
| --- | --- | --- |
| 1,343,393 | Hoffman | June 15, 1920 |
| 1,345,586 | Coblentz | July 6, 1920 |
| 1,372,043 | Routin | Mar. 22, 1921 |
| 1,774,826 | Ely | Sept. 2, 1930 |
| 1,932,469 | Leib et al. | Oct. 31, 1933 |
| 2,231,929 | Lyman | Feb. 18, 1941 |

OTHER REFERENCES

"Wireless World" for Jan. 10, 1936, page 39, and June 26, 1936, pages 623 and 624.